United States Patent
Lin et al.

(10) Patent No.: US 9,319,992 B2
(45) Date of Patent: Apr. 19, 2016

(54) MEASURING METHOD AND DEVICE BEFORE DIFFERENT-FREQUENCY HANDOVER OF USER TERMINAL

(71) Applicant: Huawei Technologies Co., Ltd., Shenzhen, Guangdong (CN)

(72) Inventors: Xuehong Lin, Shenzhen (CN); Changmei Liu, Shenzhen (CN); Shengyu Li, Shenzhen (CN); Jie Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 74 days.

(21) Appl. No.: 14/334,343

(22) Filed: Jul. 17, 2014

(65) Prior Publication Data

US 2014/0349648 A1 Nov. 27, 2014

Related U.S. Application Data

(63) Continuation of application No. PCT/CN2012/087625, filed on Dec. 27, 2012.

(30) Foreign Application Priority Data

Jan. 17, 2012 (CN) .......................... 2012 1 0014081

(51) Int. Cl.
*H04W 36/00* (2009.01)
*H04W 52/18* (2009.01)
*H04W 36/24* (2009.01)

(52) U.S. Cl.
CPC .......... *H04W 52/18* (2013.01); *H04W 36/0088* (2013.01); *H04W 36/24* (2013.01); *Y02B 60/50* (2013.01)

(58) Field of Classification Search
CPC ... H04W 52/18; H04W 36/088; H04W 36/00; H04W 36/24
USPC .................................. 455/436, 437; 370/338
See application file for complete search history.

(56) References Cited

U.S. PATENT DOCUMENTS

| 2008/0146154 A1* | 6/2008 | Claussen ............. H04W 52/244 455/63.1 |
| 2010/0074227 A1* | 3/2010 | Boncz ................... H04W 52/40 370/331 |
| 2012/0028676 A1 | 2/2012 | He |

FOREIGN PATENT DOCUMENTS

| CN | 101557628 A | 10/2009 |
| CN | 101754314 A | 6/2010 |
| CN | 101873657 A | 10/2010 |

OTHER PUBLICATIONS

"3$^{rd}$ Generation Partnership Project; Technical Specification Group Radio Access Network; Evolved Universal Terrestrial Radio Access (E-UTRA); Further advancements for E-UTRA physical layer aspects (Release 9)," 3GPP TR 36.814, V9.0.0, pp. 1-107, 3$^{rd}$ Generation Partnership Project, Valbonne, France (Mar. 2010).

(Continued)

*Primary Examiner* — Marcos Batista
(74) *Attorney, Agent, or Firm* — Leydig, Voit & Mayer, Ltd.

(57) ABSTRACT

A measuring method and device before different-frequency handover of a user terminal is provided. The measuring method before different-frequency handover of a user terminal in this embodiment comprises: receiving spectrum information from a non-serving base station, the spectrum information comprising the receiving power of the non-serving base station, and the receiving power of the non-serving base station being the intensity of a sending signal of the user terminal received by the non-serving base station, which is measured by the non-serving base station; obtaining the transmitting power of the user terminal; and when it is judged that the difference between the transmitting power of the user terminal and the receiving power of the non-serving base station is less than a preset threshold, sending a measurement instruction to the user terminal so as to indicate the user terminal to measure the non-serving base station.

21 Claims, 7 Drawing Sheets

(56) References Cited

OTHER PUBLICATIONS

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300, V11.0.0, pp. 1-194, 3$^{rd}$ Generation Partnership Project, Valbonne, France (Dec. 2011).

"Cell identity reporting in proximity indication," 3GPP TSG-RAN WG2 #68bis, Valencia Spain, Tdoc-R2-100517, 3$^{rd}$ Generation Partnership Project, Valbonne, France (Jan. 18-22, 2010).

\* cited by examiner

MEASURING METHOD AND DEVICE BEFORE DIFFERENT-FREQUENCY HANDOVER OF USER TERMINAL

CROSS-REFERENCE TO RELATED APPLICATIONS

The present application is a continuation of International Patent Application No. PCT/CN2012/087625, filed on Dec. 27, 2012, which claims priority to Chinese Patent Application No. 201210014081.1, filed on Jan. 17, 2012, both of which are hereby incorporated by reference in their entireties.

TECHNICAL FIELD

The present disclosure relates to the filed of communication, and in particular, to a method and a device for performing a measurement before inter-frequency handover of a user terminal.

BACKGROUND

In recent years, in order to adapt to changes of communication market and satisfy a increasing demand of communication service, sub base stations and sub-cells are provided in The $3^{rd}$ Generation Partnership Project (3GPP) to extend coverage of cells and increase a system throughput and spectrum efficiency of a cell. The communication network including both macro base stations and micro base stations is called as a heterogeneous network. During the arrangement of the heterogeneous network, the frequency of the micro base station may differ from the frequency of the macro base station. Thus, a user terminal may switch between the macro base station and the micro base station, i.e., perform an inter-frequency handover. However, when the user terminal performs the inter-frequency handover in existing technologies, multi-times measurements should be performed to determine whether the user terminal is close to a target base station, and thus the user terminal has a high power consumption.

SUMMARY

A method and a device for performing a measurement before inter-frequency handover of a user terminal are provided according to embodiments of the disclosure, which instruct the user terminal to perform a measurement on a non-service base station after it is determined that the user terminal is close to the non-service base station. Thus, the times of measurement on the user terminal and a power consumption of the user terminal is decreased.

For the above objective, the following technical solution is applied according to embodiments of the disclosure.

In one aspect, a method for performing a measurement before inter-frequency handover of a user terminal is provided according to embodiments of the disclosure. The method includes:

receiving spectrum information from a non-service base station, where the spectrum information includes a received power of the non-service base station, and the non-service base station measures an intensity of a signal sent by the user terminal and received by the non-service base station as the received power of the non-service base station;

obtaining a transmitted power of the user terminal; and in the case it is determined that a difference between the transmitted power of the user terminal and the received power of the non-service base station is smaller than a preset threshold, sending to the user terminal a measurement instruction for instructing the user terminal to perform the measurement on the non-service base station.

In another aspect, another method for performing a measurement before inter-frequency handover of a user terminal is provided according to the embodiments of the disclosure. The method includes:

receiving, by the user terminal, a measurement instruction from a service base station, where the measurement instruction is sent in the case that the service base station determines that a difference between a transmitted power of the user terminal and a received power of a non-service base station in spectrum information is smaller than a preset threshold, the non-service base station measures an intensity of a signal sent by the user terminal and received by the non-service base station as the received power of the non-service base station; and performing, by the user terminal, the measurement on the non-service base station based on the measurement instruction.

In further another aspect, a service base station is provided according to the embodiments of the disclosure. The service base station includes:

a receiver configured to receive spectrum information from a non-service base station, wherein the spectrum information includes a received power of the non-service base station, and the non-service base station measures an intensity of a signal sent by a user terminal and received by the non-service base station as the received power of the non-service base station;

an obtaining unit configured to obtain a transmitted power of the user terminal;

a determination module configured to determine whether a difference between the transmitted power of user terminal and the received power of the non-service base station is smaller than a preset threshold; and a sender configured to in the case that the difference between the transmitted power of user terminal and the received power of the non-service base station is smaller than the preset threshold, send to the user terminal a measurement instruction for instructing the user terminal to perform the measurement on the non-service base station.

In still another aspect, a user terminal is provided according to the embodiments of the disclosure. The user terminal includes:

a receiver configured to receive a measurement instruction from a service base station, wherein the measurement instruction is sent in the case that the service base station determines that a difference between a transmitted power of the user terminal and a received power of a non-service base station in spectrum information is smaller than a preset threshold, and the non-service base station measures an intensity of a signal sent by the user terminal and received by the non-service base station as the received power of the non-service base station; and a measurement module configured to perform a measurement on the non-service base station based on the measurement instruction.

With the method and device for performing the measurement before inter-frequency handover of the user terminal according to the embodiments of the disclosure, the received power of the non-service base station is received; the transmitted power of the user terminal is obtained; in the case that it is determined that the difference between the transmitted power of the user terminal and the received power of the non-service base station is smaller than the preset threshold, the measurement instruction is sent to the user terminal, which instructs the user terminal to perform the measurement on the non-service base station. With the solution, the user terminal may be instructed to perform the measurement on the non-service base station after it is determined that the user terminal is close to the non-service base station. Therefore, the user terminal performs less times of measurement and power consumption of the user terminal is decreased.

BRIEF DESCRIPTION OF DRAWINGS

In order to more clearly illustrate the technical solutions in embodiments of the disclosure or in the prior art, in the following, accompanying drawings referred to describe the embodiments or the prior art are introduced simply. Obviously, the accompanying drawings in the following description are just some embodiments recited in the disclosure. For those skilled in the art, other accompanying drawings can also be obtained based on these accompanying drawings provided herein without any creative work.

DETAILED DESCRIPTION OF EMBODIMENTS

Details such as specific system structures, interfaces and technologies are given in the following description for thoroughly understanding rather than limiting the disclosure. However, those skilled in the art will recognize that the disclosure may also be implemented according to other embodiments without those details. In other situations, detailed description of well known devices, circuits and methods is omitted to prevent the description of the disclosure from being affected by unnecessary details.

Various technologies described in the specification may be applied in various wireless communication systems such as current 2G communication system, current 3G communication system and next generation communication system, including Global System for Mobile Communications (GSM) system, Code Division Multiple Access (CDMA) system, Time Division Multiple Access (TDMA) system, Wideband Code Division Multiple Access (WCDMA) system, Frequency Division Multiple Access (FDMA) system, Orthogonal Frequency-Division Multiple Access (OFDMA) system, Single Carrier-FDMA (SC-FDMA) system, General Packet Radio Service (GPRS) system, Long Term Evolution (LTE) system, and other communication systems.

Various aspects of the disclosure are described in conjunction with a terminal and/or a base station and/or a base station controller.

A user terminal may be either a wireless terminal or a wired terminal. The wireless terminal may include a device providing a voice and/or data connectivity to a user, a handheld device with a wireless connection function, or other processing devices connected to a Modem. The wireless terminal may communicate with one or multiple core networks via Radio Access Network (RAN). The wireless terminal may be a mobile terminal such as mobile phone (called as cellular phone); and a computer with a mobile terminal, for example, portable mobile device, pocket mobile device, handheld mobile device, built-in mobile device of a computer or vehicle-carried mobile device, which exchanges voice and/or data with the RAN. The wireless terminal may further include Personal Communication Service (PCS) phone, wireless phone, Session Initiation Protocol (SIP) phone, Wireless Local Loop (WLL) station and Personal Digital Assistant (PDA), etc. The wireless terminal may also be called as a system, Subscriber Unit, Subscriber Station, Mobile Station, Mobile, Remote Station, Access Point, Remote Terminal, Access Terminal, User Terminal, User Agent, User Device or User Equipment.

The base station (such as an access point) may be a device in an access network located, which may communicates with the wireless terminal via one or multiple sectors through an air interface. The base station may transform a received air frame into an IP packet. The base station functions as a router between the wireless terminal and other components of the access network. The other components of the access network may include Internet Protocol (IP) network. The base station may further perform a property management for the air interfaces. The base station may include Base Transceiver Station (BTS) in GSM or CDMA, Node Base in WCDMA, and Node Base or evolutional Node Base (eNB or e-Node B) in LTE. The disclosure is not limited in this aspect.

In addition, terms "system" and "network" usually may be used interchangeably in the specification.

First Embodiment

Figure 1:
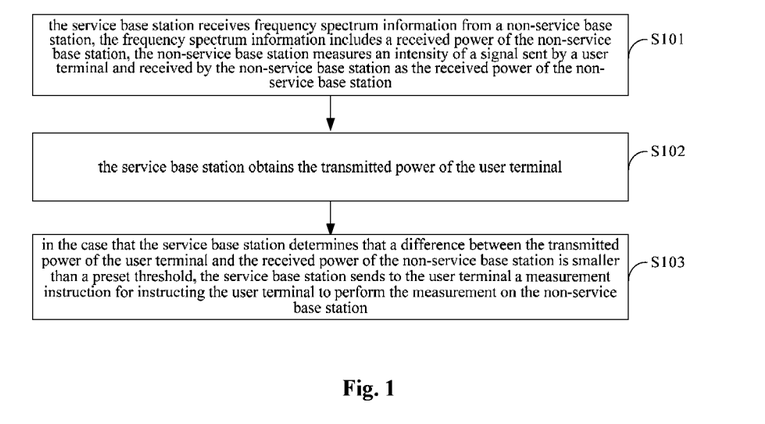
FIG. 1 is a schematic flow chart of a method for performing a measurement by a service base station before inter-frequency handover of a user terminal according to a first embodiment of the disclosure.

A method for performing a measurement before inter-frequency handover of a user terminal is provided according to the first embodiment of the disclosure. The method is implemented by a service base station. As shown in FIG. 1, the method includes steps S101-S103.

In the step S101, the service base station receives spectrum information from a non-service base station. The spectrum information includes a received power of the non-service base station, the non-service base station measures an intensity of a signal sent by a user terminal and received by the non-service base station as the received power of the non-service base station.

The non-service base station measures the intensity of the signal sent by the user terminal and received by the non-service base station as the received power of the non-service base station. The non-service base station may perform the measurement periodically or aperiodically, or perform the measurement in response to a trigger condition, which does not limit the embodiment of the disclosure. The received power of the non-service base station is further sent to the service base station.

For example, the non-service base station may measure the intensity of the signal sent from the user terminal as the received power of the non-service base station, where the signal is carried at a first resource block and received by the non-service base station. Hence, the non-service base station may further obtain a measurement time and identification information of the first resource block and send to the service base station the received power of the non-service base station, the measurement time and the identification information of the first resource block.

For example, the service base station determines which user terminal is measured by the non-service base station, based on the identification information of the first resource block and the measurement time which are sent from the non-service base station. Then, the service base station further sends a first reporting instruction to the user terminal. The user terminal reports a transmitted power of the user terminal in response to the first reporting instruction.

In addition, the service base station may schedule the user terminal flexibility and rapidly in a Long Term Evolution (LTE) network. Therefore, the resource block occupied when the user terminal sends uplink signal data may alters per millisecond, and the user terminal may multiplex a determined resource block at an uplink time-frequency domain, i.e., multiple user terminals may occupy the resource block at a same time-frequency domain. In this case, the intensity of the signal sent by the user terminal may be a sum of the intensities of signals sent by multiple user terminals, where the signal sent from the user terminal is received by the non-service base station and carried on the first resource block, and the intensity of the signal is measured by the non-service base station. Hence, the non-service base station is required to obtain Sounding Reference Signal (SRS) configuration information of the user terminals, and the non-service base station may measure the received power of the non-service base station based on the SRS configuration information, where the received power of the non-service base station is received by the non-service base station. The received power corresponds to the intensities of the signals sent by the user terminals, and the intensities of the signals sent by respective user terminals may further be distinguished from each other. A macro base station may actively send the SRS configuration information of the user terminals to the non-service base station, or the non-service base station may obtain the SRS configuration information of the user terminals by sending request information to the macro base station, which is not limited by the embodiment of the disclosure.

Furthermore, because the service base station schedules the user terminal flexibility and rapidly in a Long Term Evolution (LTE) network, the resource block occupied when the user terminal sends uplink signal data may alters per millisecond, and the user terminal may multiplex a determined resource block at an uplink time-frequency domain, i.e., multiple user terminals occupy the resource block at a same time-frequency domain. In this case, the service base station or the user terminal may be configured to provide a unique mapping between the identification information of the user terminal and the first resource block, i.e., the identification information of the user terminal uniquely corresponds to the first resource block. In this way, it is determine that a resource block is merely used by a user terminal, which is not multiplexed by other user terminals. The transmitted power of the user terminal may be configured by the service base station or may be stored by the user terminal. The service base station may configure the transmitted power of the user terminal with configuration information of a broadcast message or by sending a Radio Resource Control (RRC) signaling to the user terminal.

It should be noted that two methods are described illustratively according to the embodiment of the disclosure. In the first method, the service base station sends the SRS configuration information of the user terminals to the non-service base station; and the non-service base station measures, based on the SRS configuration information, the intensity of the signal and received by the non-service base station and corresponding to a signal sent by the user terminal. In the second method, the service base station or the user terminal may be configured to provide the unique mapping between the identification information of the user terminal and the first resource block, i.e., the identification information of the user terminal uniquely corresponds to the first resource block. With those two methods, the non-service base station measures the intensity of the signal sent by the user terminal, i.e., the received power of the non-service base station, where the signal is received by the non-service base station and carried on the first resource block. Other approaches are not further described here and should fall in the scope of protection of the embodiment of the disclosure.

In the step S102, the service base station obtains a transmitted power of the user terminal.

For example, the service base station may send first reporting instruction to the user terminal and then receive from the user terminal the transmitted power of the user terminal, to obtain the transmitted power of the user terminal. The service base station may send configuration information through RRC, broadcast message, Medium Access Control (MAC) layer or physical layer. Based on the configuration information, the user terminal is configured to send a signal with a certain power at a certain time or on a certain time-frequency domain resource. The transmitted power of the user terminal is preset and prestored. Thus, the prestored transmitted power of the user terminal is further obtained. The signal may be SRS or Channel State Information-Reference Signal (CSI-RS).

In the step S103, the service base station determines that a difference between the transmitted power of the user terminal and the received power of the non-service base station is smaller than a preset threshold, sends to the user terminal a measurement instruction for instructing the user terminal to perform the measurement on the non-service base station.

In the case the service base station determines, based on the received power of the non-service base station and the transmitted power of the user terminal, that the difference between the transmitted power of the user terminal and the received power of the non-service base station is smaller than the preset threshold, i.e., in the case that the user terminal is close to the non-service base station, the service base station sends to the user terminal the measurement instruction for instructing the user terminal to perform the measurement on the non-service base station.

The service base station performs the determination based on the following principle:

in a wireless communication environment, a signal transmission model is generally described as: $Pr=Pt-PL-SF$.

Pr represents the received power. Pt represents the transmitted power. PL represents a pass loss. In the case of the carrier frequency of 2 GHz, according to a path loss model for heterogeneous network simulation in the 3GPP 36.814 protocol, the path loss between the non-service base station and the user terminal is defined by: $PL(dB)=140.7+36.7 lgd$, i.e., the loss increases as the distance of the path extends. SF represents shadow fading, which is consistent with lognormal distribution. A partial effect of the shadow fading is eliminated by averaging in many times. Accordingly, the signal transmission model is simplified as: $Pr=Pt-PL$.

Therefore, the difference between the transmitted power of the user terminal and the received power of the non-service base station is the path loss between the non-service base station and the user terminal. According to the path loss model, the shorter the distance between the user terminal and the non-service base station, the smaller the path loss.

Figure 2:
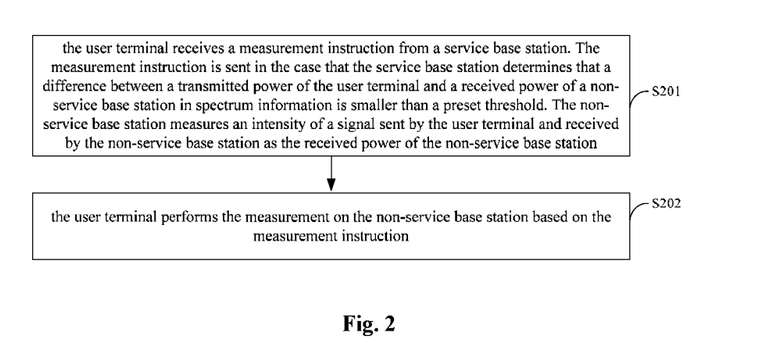
FIG. 2 is a schematic flow chart of a method for performing a measurement by a user terminal before inter-frequency handover of the user terminal according to the first embodiment of the disclosure.

A method for performing measurement before inter-frequency handover of a user terminal is further provided according to the embodiment. The method is implemented by the user terminal. As shown in FIG. 2, the method includes steps S201-S202.

In the step S201, the user terminal receives a measurement instruction from a service base station. The measurement instruction is sent in the case that the service base station determines that a difference between a transmitted power of the user terminal and a received power of a non-service base station in spectrum information is smaller than a preset threshold. The non-service base station measures an intensity of a signal sent by the user terminal and received by the non-service base station as the received power of the non-service base station.

For example, the service base station sends a first reporting instruction to the user terminal. The first reporting instruction is sent after the service base station receives from the non-service base station the received power of the non-service base station. The non-service base station measures the intensity of the signal sent by the user terminal and received by the non-service base station as the received power of the non-service base station. Then, the user terminal sends the transmitted power of the user terminal to the service base station after the user terminal receives the first reporting instruction from the service base station.

If the service base station determines that the difference between the transmitted power of the user terminal and the received power of the non-service base station is smaller than the preset threshold, i.e., if the user terminal is close to the non-service base station, the service base station sends the measurement instruction to the user terminal. The user terminal performs the measurement on the non-service base station after receiving the measurement instruction.

In the step S202, the user terminal performs measurement on the non-service base station based on the measurement instruction.

In the method for performing the measurement before inter-frequency handover of the user terminal according to the embodiments of the disclosure, the received power of the non-service base station is received; the transmitted power of the user terminal is obtained; the measurement instruction is sent to the user terminal, to instruct the user terminal to perform measurement on the non-service base station in the case that it is determined that the difference between the transmitted power of the user terminal and the received power of the non-service base station is smaller than the preset threshold. With this solution, the user terminal may be instructed to perform the measurement on the non-service base station after it is determined that the user terminal is close to the non-service base station. Thus, the user terminal performs less times of measurement, and power consumption of the user terminal is decreased.

Second Embodiment

Figure 3A:
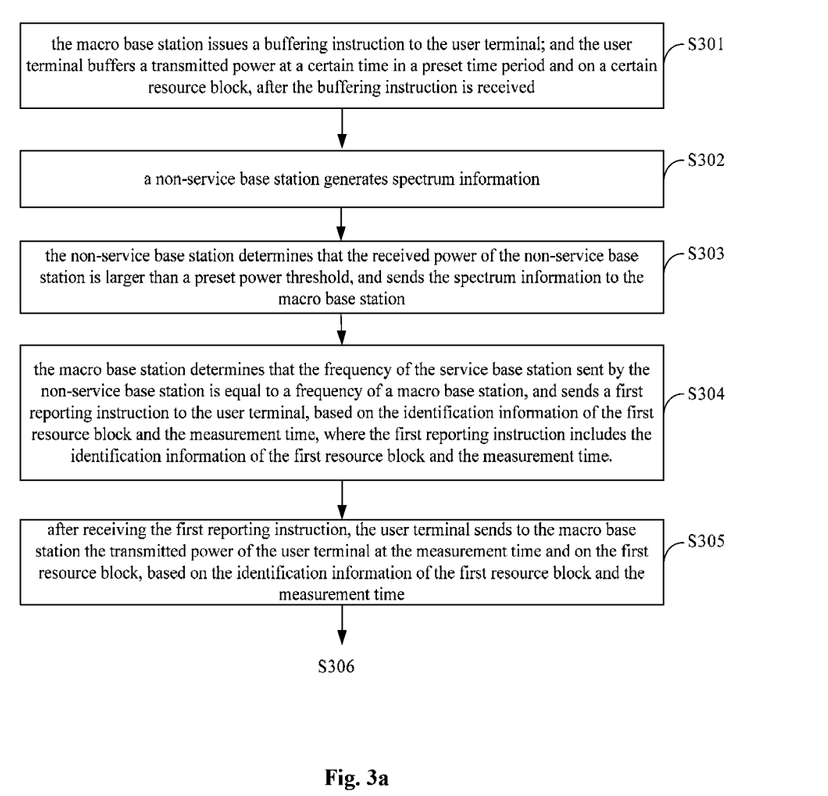
FIGS. 3a and 3b are schematic flow charts of a method for performing a measurement before inter-frequency handover of a user terminal according to a second embodiment of the disclosure.
Figure 3B:
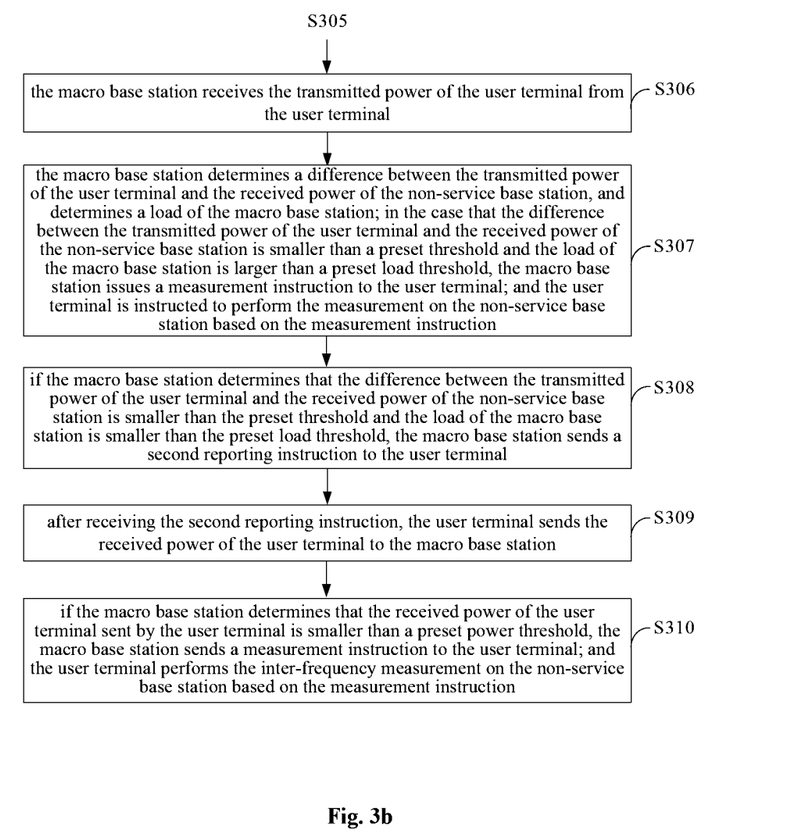

A method for performing a measurement before inter-frequency handover of a user terminal is further provided according to the embodiment, as shown in FIGS. 3a and 3b. In this embodiment, a service base station is a macro base station, and the method may include steps S301-S310.

In the step S301, the macro base station issues a buffering instruction to the user terminal; and the user terminal buffers a transmitted power at a certain time in a preset time period and on a certain resource block, after the buffering instruction is received.

The user terminal may have different transmitted power at different time and on different resource blocks. Thus, the macro base station may send the buffering instruction to the user terminal when the user terminal enters the coverage of the macro base station. The buffering instruction is configured to instruct the user terminal to buffer the transmitted power at the certain time and on the certain resource block in the preset time period.

For example, the resource block is a wireless resource block, which may be defined, based on one or any combination of time domain, frequency domain, space domain and code domain. The resource block may be obtained through a negotiation between two base stations. The resource block may be a Physical Resources Block (PRB), such as the PRB obtained through a negotiation between two base stations; a subcarrier, such as the subcarrier obtained through a negotiation between two base stations, or a Resource Element (RE), such as the RE obtained through a negotiation between two base stations.

In the step S302, a non-service base station generates spectrum information.

The spectrum information may include an intensity of a signal sent by a user terminal, i.e., the received power of the non-service base station. The signal is carried on a first resource block and received by the non-service base station, and the intensity of the signal is measured by the non-service base station. The spectrum information may further include a measurement time of the non-service base station, a frequency of the service base station and identification information of the first resource block. The spectrum information may further include user terminal identification information corresponding to the user terminal. Therefore, the macro base station may determine which user terminal is measured by the non-service base station, based on the measurement time and the identification information of the first resource block, or based on the user terminal identification information.

The non-service base station measures the intensity of the signal sent by the user terminal as the received power of the non-service base station, where the signal is received by the non-service base station and carried on the first resource block. The non-service base station may measure the intensity of the signal periodically or aperiodically, or measures the intensity of the signal based on a trigger condition, which is not limited by the embodiment of the disclosure. The received power of the non-service base station is sent to the macro base station. In addition, the non-service base station may obtain the measurement time and the identification information of the first resource block, and may send the received power of the non-service base station, the measurement time and the identification information of the first resource block to the macro base station.

For example, the identification information of the first resource block may include any one of time domain information, frequency domain information, space information, code division information, and the combination thereof, which may be used to determine the first resource block. Alternatively, the identification information of the first resource block may include time domain information and frequency domain information.

In addition, the service base station schedules the user terminal flexibility and rapidly in the LTE network. Therefore, the resource block occupied when the user terminal sends uplink signal data may alters per millisecond, and the user terminal may multiplex a determined resource block at an uplink time-frequency domain, i.e., multiple user terminals may occupy the resource block at a same time-frequency domain. In this case, the intensity of the signal sent by the user terminal may be a sum of the intensities of signals sent by multiple user terminals, where the signal sent from the user terminal is received by the non-service base station and carried on the first resource block, and the intensity of the signal is measured by the non-service base station. Hence, the non-service base station is required to obtain SRS configuration information of the user terminals, and the non-service base station may measure, based on the SRS configuration information, the intensity of the signal received by the non-service base station and corresponding to the signal sent by the user terminal. Thus, the intensities of the signals sent by respective user terminals may further be distinguished from each other. A macro base station may actively send the SRS configuration information of the user terminals to the non-service base station, or the non-service base station may obtain the SRS configuration information of the user terminals by sending request information to the macro base station, which is not limited by the embodiment of the disclosure.

Furthermore, because the service base station schedules the user terminal flexibility and rapidly in a Long Term Evolution (LTE) network, the resource block occupied when the user terminal sends uplink signal data may alters per millisecond, and the user terminal may multiplex a determined resource block at an uplink time-frequency domain, i.e., multiple user terminals occupy the resource block at a same time-frequency domain. In this case, the service base station or the user terminal may be configured to provide a unique mapping between the identification information of the user terminal and the first resource block, i.e., the identification information of the user terminal uniquely corresponds to the first resource block. In this way, it is determined that a resource block is merely used by a user terminal, which is not multiplexed by other user terminals. The transmitted power of the user terminal may be configured by the service base station or may be stored by the user terminal. The service base station may configure the transmitted power of the user terminal with configuration information of a broadcast message or by sending a Radio Resource Control (RRC) signaling to the user terminal.

It should be noted that two methods are described illustratively according to the embodiment of the disclosure. In the first method, the service base station sends the SRS configuration information of the user terminals to the non-service base station; and the non-service base station measures, based on the SRS configuration information, the intensity of the signal received by the non-service base station and corresponding to a signal sent by the user terminal. In the second method, the service base station or the user terminal may be configured to provide the unique mapping between the identification information of the user terminal and the first resource block, i.e., the identification information of the user terminal uniquely corresponds to the first resource block. With those two methods, the non-service base station measures the intensity of the signal sent by the user terminal, i.e., the received power of the non-service base station, where the signal is received by the non-service base station and carried on the first resource block. Other approaches are not further described here and should fall in the scope of protection of the embodiment of the disclosure.

In the step S303, the non-service base station determines that the received power of the non-service base station is larger than a preset power threshold, and sends the spectrum information to the macro base station.

For example, the non-service base station may rank received powers of the non-service base station and determine the received powers larger than the preset power threshold. The non-service base station sends the spectrum information to the macro base station if it is determined that the received power of the non-service base station is larger than the preset power threshold.

In the step S304, the macro base station determines that the frequency of the service base station sent by the non-service base station is equal to a frequency of a macro base station, and sends a first reporting instruction to the user terminal, based on the identification information of the first resource block and the measurement time. The first reporting instruction includes the identification information of the first resource block and the measurement time.

If the macro base station determines that the frequency of the service base station sent by the non-service base station is equal to the frequency of the macro base station, i.e., if the macro base station determines itself as a service base station of the user terminal, the macro base station determines which user terminal is measured by the non-service base station, based on the identification information of the first resource block and the measurement time, and sends to the user terminal the first reporting instruction for instructing the user terminal to report the received power of the user terminal. The first reporting instruction may include the identification information of the first resource block and the measurement time.

In the step S305, after receiving the first reporting instruction, the user terminal sends to the macro base station the transmitted power of the user terminal at the measurement time and on the first resource block, based on the identification information of the first resource block and the measurement time.

The user terminal may buffer the transmitted power at a certain time in the preset time period and on a certain resource block. Therefore, the user terminal may determine the transmitted power of the user terminal at the measurement time and on the first resource block, based on the first reporting instruction sent by the macro base station, the identification information of the first resource block and the measurement time. Then, the transmitted power of the user terminal is sent to the macro base station.

In the step S306, the macro base station receives the transmitted power of the user terminal from the user terminal.

In the step S307, the macro base station determines a difference between the transmitted power of the user terminal and the received power of the non-service base station, and determines a load of the macro base station. In the case that the difference between the transmitted power of the user terminal and the received power of the non-service base station is smaller than a preset threshold and the load of the macro base station is larger than a preset load threshold, the macro base station issues a measurement instruction to the user terminal. The user terminal is instructed to perform the measurement on the non-service base station based on the measurement instruction.

If the macro base station determines that the difference between the transmitted power of the user terminal and the received power of the non-service base station is smaller than the preset threshold and the load of the macro base station is larger than the preset load threshold, the macro base station sends the measurement instruction to the user terminal; and after receiving the measurement instruction, the user terminal performs the measurement on the non-service base station based on the measurement instruction; else, the procedure proceeds to the step S308.

In addition, the measurement instruction may include a frequency of the non-service base station. The user terminal may perform the measurement on the non-service base station based on the frequency of the non-service base station in the measurement instruction.

In the step S308, if the macro base station determines that the difference between the transmitted power of the user terminal and the received power of the non-service base station is smaller than the preset threshold and the load of the macro base station is smaller than the preset load threshold, the macro base station sends a second reporting instruction to the user terminal.

If the macro base station determines that the difference between the transmitted power of the user terminal and the received power of the non-service base station is smaller than the preset threshold and the load of the macro base station is smaller than the preset load threshold, the macro base station sends the second reporting instruction to the user terminal. The user terminal reports the received power of the user terminal in response to the second reporting instruction. The received power of the user terminal is the intensity of a signal sent by the macro base station and received by the user terminal.

In the step S309, after receiving the second reporting instruction, the user terminal sends the received power of the user terminal to the macro base station.

In the step S310, if the macro base station determines that the received power of the user terminal sent by the user terminal is smaller than a preset power threshold, the macro base station sends a measurement instruction to the user terminal. The user terminal performs the inter-frequency measurement on the non-service base station based on the measurement instruction.

If the macro base station determines that the received power of the user terminal sent by the user terminal is smaller than the preset power threshold, the macro base station sends the measurement instruction to the user terminal. After receiving the measurement instruction, the user terminal performs the measurement on the non-service base station based on the measurement instruction.

The measurement instruction may include a frequency of the non-service base station, and the user terminal may perform the measurement on the non-service base station based on the frequency of the non-service base station in the measurement instruction.

Figure 4A:
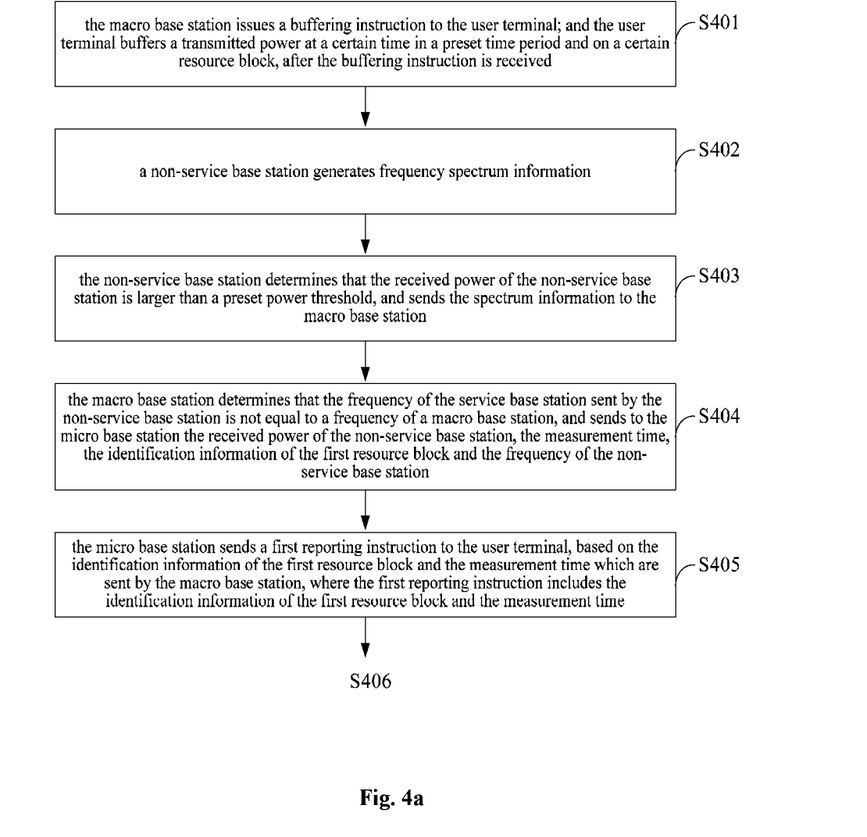
FIGS. 4a and 4b are schematic flow charts of another method for performing a measurement before inter-frequency handover of a user terminal according to the second embodiment of the disclosure.
Figure 4B:
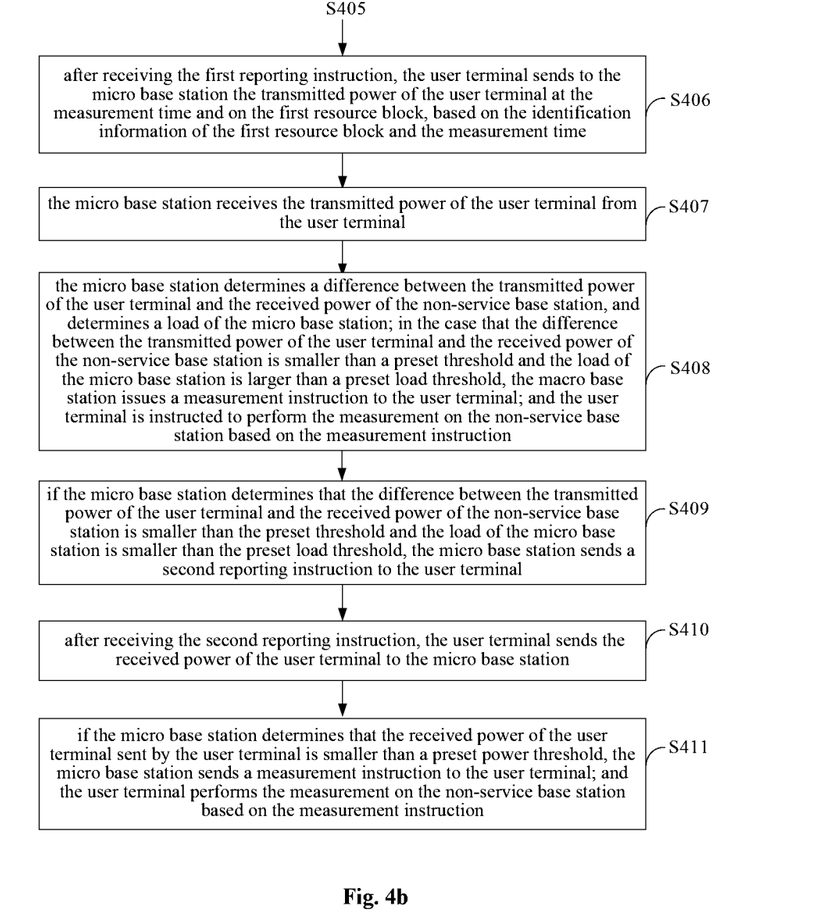

A method for performing a measurement before inter-frequency handover of a user terminal is further provided according to an embodiment, as shown in FIGS. 4a and 4b. In this embodiment, a service base station is a micro base station within coverage of a macro base station. The method includes steps S401-S411.

In the step S401, the macro base station issues a buffering instruction to the user terminal; and the user terminal buffers a transmitted power at a certain time in a preset time period and on a certain resource block, after the buffering instruction is received.

The user terminal may have different transmitted power at different time and on different resource blocks. Thus, the macro base station may send the buffering instruction to the user terminal when the user terminal enters the coverage of the macro base station. The buffering instruction is configured to instruct the user terminal to buffer the transmitted power at the certain time and on the certain resource block in the preset time period.

For example, the resource block is a wireless resource block, which may be defined, based on any one of time domain, frequency domain, space domain, code domain and the combination thereof. The resource block may be obtained through a negotiation between two base stations. The resource block may be a PRB, such as the PRB obtained through a negotiation between two base stations, a subcarrier, such as the subcarrier obtained through a negotiation between two base stations, or a RE, such as the RE obtained through a negotiation between two base stations.

In the step S402, a non-service base station generates spectrum information.

The spectrum information may include an intensity of a signal sent by a user terminal, i.e., the received power of the non-service base station. The signal is carried on a first resource block and received by the non-service base station, and the intensity of the signal is measured by the non-service base station. The spectrum information may further include a measurement time of the non-service base station, a frequency of the service base station and identification information of the first resource block. The spectrum information may further include user terminal identification information corresponding to the user terminal. Therefore, the macro base station may determine which user terminal is measured by the non-service base station, based on the measurement time and the identification information of the first resource block, or based on the user terminal identification information.

The non-service base station measures the intensity of the signal sent by the user terminal as the received power of the non-service base station, where the signal is received by the non-service base station and carried on the first resource block. The non-service base station may measure the intensity of the signal periodically or aperiodically, or measure the intensity of the signal based on a trigger condition, which is not limited by the embodiment of the disclosure. The received power of the non-service base station is sent to the macro base station. In addition, the non-service base station may obtain the measurement time and the identification information of the first resource block, and may send the received power of the non-service base station, the measurement time and the identification information of the first resource block to the macro base station.

For example, the identification information of the first resource block may include any one of time domain information, frequency domain information, space information, code division information, and the combination thereof, which may be used to determine the first resource block. Alternatively, the identification information of the first resource block may include time domain information and frequency domain information.

In the step S403, the non-service base station determines that the received power of the non-service base station is larger than a preset power threshold, and sends the spectrum information to the macro base station.

For example, the non-service base station may rank received powers of the non-service base station and determine the received powers larger than the threshold. The non-service base station sends the spectrum information to the macro base station if it is determined that the received power of the non-service base station is larger than the preset power threshold.

In the step 404, the macro base station determines that the frequency of the service base station sent by the non-service base station is not equal to a frequency of a macro base station, and sends to the micro base station the received power of the non-service base station, the measurement time, the identification information of the first resource block and the frequency of the non-service base station.

If the macro base station determines that the frequency of the service base station sent by the non-service base station is not equal to the frequency of a macro base station, i.e., if the macro base station determines the micro base station as the service base station of the user terminal, the macro base station sends to the micro base station the received power of the non-service base station, the measurement time, the identification information of the first resource block and the frequency of the non-service base station.

In the step S405, the micro base station sends a first reporting instruction to the user terminal, based on the identification information of the first resource block and the measurement time which are sent by the macro base station. The first reporting instruction includes the identification information of the first resource block and the measurement time.

After receiving from the macro base station the received power of the non-service base station, the measurement time, the identification information of the first resource block and the frequency of the non-service base station, the micro base station determines which user terminal is measured by the non-service base station, based on the identification information of the first resource block and the measurement time; and sends the first reporting instruction to the user terminal. The user terminal reports the received power of the user terminal in response to the first reporting instruction. The first reporting instruction may include the identification information of the first resource block and the measurement time.

In the step S406, after receiving the first reporting instruction, the user terminal sends to the micro base station the transmitted power of the user terminal at the measurement time and on the first resource block, based on the identification information of the first resource block and the measurement time.

The user terminal may buffer the transmitted power at a certain time in the preset time period and on a certain resource block. Therefore, the user terminal may determine the transmitted power of the user terminal at the measurement time and on the first resource block, based on the first reporting instruction sent by the micro base station, the identification information of the first resource block and the measurement time. Then, the transmitted power of the user terminal is sent to the micro base station.

In the step S407, the micro base station receives the transmitted power of the user terminal from the user terminal.

In the step S408, the micro base station determines a difference between the transmitted power of the user terminal and the received power of the non-service base station, and determines a load of the micro base station. In the case that the difference between the transmitted power of the user terminal and the received power of the non-service base station is smaller than a preset threshold and the load of the micro base station is larger than a preset load threshold, the macro base station issues a measurement instruction to the user terminal. The user terminal is instructed to perform the measurement on the non-service base station based on the measurement instruction.

If the micro base station determines that the difference between the transmitted power of the user terminal and the received power of the non-service base station is smaller than the preset threshold and the load of the micro base station is larger than the preset load threshold, the micro base station sends the measurement instruction to the user terminal; and after receiving the measurement instruction, the user terminal performs the measurement on the non-service base station based on the measurement instruction; else, the procedure proceeds to the step S409.

In addition, the measurement instruction may include a frequency of the non-service base station. The user terminal may perform the measurement on the non-service base station based on the frequency of the non-service base station in the measurement instruction.

In the step S409, if the micro base station determines that the difference between the transmitted power of the user terminal and the received power of the non-service base station is smaller than the preset threshold and the load of the micro base station is smaller than the preset load threshold, the micro base station sends a second reporting instruction to the user terminal.

If the micro base station determines that the difference between the transmitted power of the user terminal and the received power of the non-service base station is smaller than the preset threshold and the load of the micro base station is smaller than the preset load threshold, the micro base station sends the second reporting instruction to the user terminal. The user terminal reports the received power of the user terminal in response to the second reporting instruction. The received power of the user terminal is the intensity of a signal sent by the micro base station and received by the user terminal.

In the step S410, after receiving the second reporting instruction, the user terminal sends the received power of the user terminal to the micro base station.

In the step S411, if the micro base station determines that the received power of the user terminal sent by the user terminal is smaller than a preset power threshold, the micro base station sends a measurement instruction to the user terminal. The user terminal performs the measurement on the non-service base station based on the measurement instruction.

In addition, the measurement instruction may include a frequency of the non-service base station. The user terminal may perform the measurement on the non-service base station based on the frequency of the non-service base station in the measurement instruction.

In the method for performing the measurement before inter-frequency handover of the user terminal according to the embodiment, the received power of the non-service base station is received; the first reporting instruction is sent to the user terminal, and the user terminal reports the transmitted power of the user terminal in response to the first reporting instruction. In the case that it is determined that the difference between the transmitted power of the user terminal and the received power of the non-service base station is smaller than the preset threshold and the load of the service base station is larger than the preset load threshold, the measurement instruction is sent to the user terminal, to instruct the user terminal to perform the measurement on the non-service base station. In the case that the difference between the transmitted power of the user terminal and the received power of the non-service base station is smaller than the preset threshold and the load of the service base station is smaller than the preset load threshold, the second reporting instruction is sent to the user terminal, and the user terminal reports the received power of the user terminal in response to the second reporting instruction. In the case that it is determined that the received power of the user terminal is smaller than the preset power threshold, the measurement instruction is sent to the user terminal to instruct the user terminal to perform the measurement on the non-service base station. With this solution, the user terminal may be instructed to perform the measurement on the non-service base station after it is determined that the user terminal is close to the non-service base station. Therefore, the user terminal performs less times of measurement, and power consumption of the user terminal is decreased.

Third Embodiment

Figure 5:
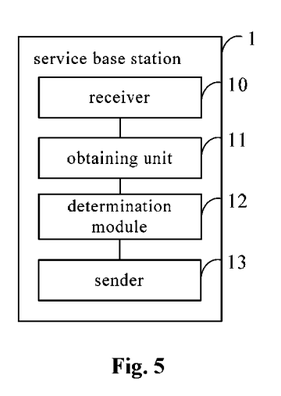
FIG. 5 is a schematic structure diagram of a service base station according to a third embodiment of the disclosure.

A service base station 1 is provided according to an embodiment of the disclosure, as shown in FIG. 5. The service base station 1 includes a receiver 10, an obtaining unit 11, a determination module 12 and a sender 13.

The receiver 10 is configured to receive spectrum information from a non-service base station. The spectrum information includes a received power of the non-service base station. The non-service base station measures an intensity of a signal sent by a user terminal and received by the non-service base station as the received power of the non-service base station.

The obtaining unit 11 is configured to obtain a transmitted power of the user terminal.

The determination module 12 is configured to determine whether a difference between the transmitted power of user terminal and the received power of the non-service base station is smaller than a preset threshold.

The sender 13 is configured to, in the case that the difference between the transmitted power of user terminal and the received power of the non-service base station is smaller than the preset threshold, send to the user terminal a measurement instruction for instructing the user terminal to perform a measurement on the non-service base station.

Furthermore, the spectrum information further includes a measurement time of the non-service base station and identification information of a first resource block. Before the transmitted power of the user terminal is obtained, the sender 13 is further configured to send to the user terminal a reporting instruction for instructing the user terminal to report the transmitted power of the user terminal, based on the measurement time of the non-service base station and the identification information of the first resource block.

Furthermore, the spectrum information further includes user terminal identification information corresponding to the user terminal. Before the transmitted power of the user terminal is obtained, the sender 13 is further configured to send to the user terminal the reporting instruction for instructing the user terminal to report the transmitted power of the user terminal, based on the user terminal identification information.

Furthermore, the sender 13 is configured to send to the user terminal a first reporting instruction for instructing the user terminal to report the transmitted power of the user terminal.

The receiver 10 is further configured to receive the transmitted power of the user terminal sent by the user terminal.

Furthermore, the obtaining unit 11 is configured to obtain a prestored transmitted power of the user terminal.

Furthermore, the determination module 12 is configured to determine whether a load of the service base station is larger than a preset load threshold.

The sender 13 is further configured to, in the case that the load of the service base is larger than the preset load threshold, send a measurement instruction to the user terminal; and in the case that the load of the service base is smaller than the preset load threshold, send to the user terminal a second reporting instruction for instructing the user terminal to report a received power of the user terminal. The received power of the user terminal is an intensity of a signal sent by the service base station and received by the user terminal.

Furthermore, the determination module 12 is configured to determine whether the received power of the user terminal is smaller than a preset power threshold.

The sender 13 is further configured to send the measurement instruction to the user terminal, in the case that the received power of the user terminal is smaller than the preset power threshold.

Furthermore, the sender 13 is configured to send SRS configuration information of the user terminal to the non-service base station. The non-service base station measures the received power of the non-service base station according to the SRS configuration information.

Figure 6:
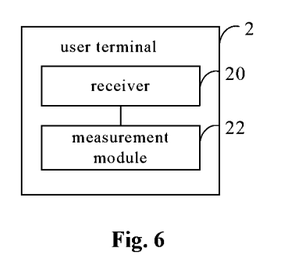
FIG. 6 is a schematic structure diagram of a user terminal according to the third embodiment of the disclosure.

A user terminal is further provided according to an embodiment of the disclosure, as shown in FIG. 6. The user terminal 2 may include a receiver 20 and a measurement module 22.

The receiver 20 is configured to receive a measurement instruction from a service base station. The measurement instruction is sent in the case that the service base station determines that a difference between a transmitted power of the user terminal and a received power of a non-service base station in spectrum information is smaller than a preset threshold. The non-service base station measures an intensity of a signal sent by the user terminal and received by the non-service base station as the received power of the non-service base station.

The measurement module 22 is configured to perform a measurement on the non-service base station based on the measurement instruction.

Furthermore, the receiver 20 is configured to receive a first reporting instruction from the service base station. The first reporting instruction is sent after the service base station receives the received power of the non-service base station.

Figure 7:
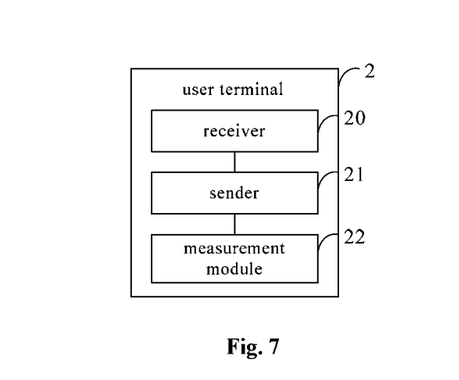
FIG. 7 is another schematic structure diagram of the user terminal according to the third embodiment of the disclosure.

The user terminal 2 further includes a sender 21, as shown in FIG. 7.

The sender 21 is configured to report the transmitted power of the user terminal based on a reporting instruction sent by the service base station.

The receiver 20 is further configured to receive the first reporting instruction from the service base station.

The sender 21 is further configured to send, based on the first reporting instruction, the transmitted power of the user terminal to the service base station.

Furthermore, the receiver 20 is configured to receive a second reporting instruction from the service base station and receive the measurement instruction from the service base station. The second reporting instruction is sent in the case that the service base station determines that a load of the service base station is smaller than a preset load threshold.

The sender 21 is further configured to send a received power of the user terminal to the service base station in response to the second reporting instruction. The received power of the user terminal is an intensity of a signal sent by the service base station and received by the user terminal.

With a device for performing a measurement before inter-frequency handover of the user terminal according to the embodiment of the disclosure, the received power of the non-service base station is received; and the transmitted power of the user terminal is obtained. If it is determined that the difference between the transmitted power of the user terminal and the received power of the non-service base station is smaller than the preset threshold, the measurement instruction is sent to the user terminal, to instruct the user terminal to perform the measurement on the non-service base station. With this solution, the user terminal may be instructed to perform the measurement on the non-service base station after it is determined that the user terminal is close to the non-service base station. In this way, the user terminal performs less times of measurement, and the power consumption of the user terminal is decreased.

Figure 8:
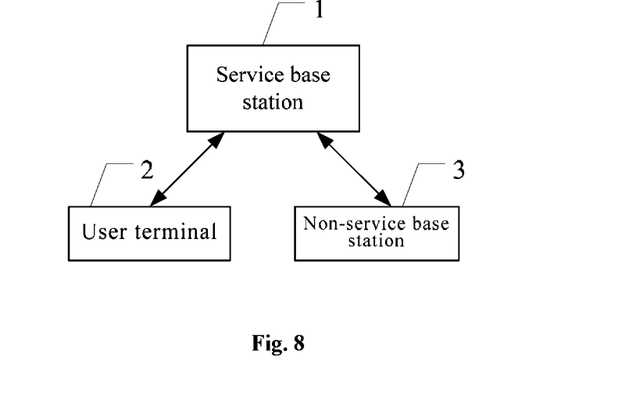
FIG. 8 is a schematic structure diagram of a communication system according to an embodiment of the disclosure.

A communication system is further provided according to an embodiment of the disclosure, as shown in FIG. 8. The communication system includes a service base station 1, a user terminal 2 and a non-service base station 3.

The service base station 1 is configured to receive spectrum information from the non-service base station 3, where the spectrum information includes a received power of the non-service base station 3, and the non-service base station 3 measures an intensity of a signal sent by the user terminal 2 and received by the non-service base station 3 as the received power of the non-service base station 3; obtain a transmitted power of the user terminal; and in the case that a difference between the transmitted power of the user terminal and the received power of the non-service base station 3 is smaller than a preset threshold, send to the user terminal 2 a measurement instruction for instructing the user terminal 2 to perform a measurement on the non-service base station 3.

The user terminal 2 is configured to receive the measurement instruction from the service base station 1 and perform the measurement on the non-service base station 3. The measurement instruction is sent in the case that the service base station determines that the difference between the transmitted power of the user terminal and the received power of the non-service base station 3 is smaller than the preset threshold. The received power of the non-service base station 3 is sent after the non-service base station 3 measures the intensity of the signal sent by the user terminal 2 and received by the non-service base station 3.

The non-service base station 3 is configured to send the received power of the non-service base station 3 to the service base station 1. The non-service base station 3 measures the intensity of the signal sent by the user terminal 2 and received by the non-service base station 3 as the received power of the non-service base station 3.

With the communication system according to the embodiment of the disclosure, the received power of the non-service base station is received; the transmitted power of the user terminal is obtained. If it is determined that the difference between the transmitted power of the user terminal and the received power of the non-service base station is smaller than the preset threshold, the measurement instruction is sent to the user terminal, to instruct the user terminal to perform measurement on the non-service base station. With this solution, the service base station may instruct the user terminal to perform the measurement on the non-service base station after it is determined that the user terminal is close to the non-service base station. In this way, the user terminal performs less times of measurement, and power consumption of the user terminal is decreased.

Those skilled in the art may understand clearly that the foregoing functional modules are divided illustratively for convenient and brief description. In practice, foregoing functions may be implemented by different function modules. That is, inner structures of the device are divided into different functional modules to implement all of or part of the functions. Operation procedures of the described system, device and units may be referred to corresponding procedures according to the method embodiments, which may be not be repeated herein.

In the embodiments of the disclosure, it may be understood that the disclosed system, device and method may be implemented in other ways. For example, the embodiments of the device described above are only schematic, for instance, the module or unit is only divided according to logic functions, which may be divided in other ways in implementation. For instance, multiple units or components may be combined with or integrated into another system, or certain features may be ignored or not be implemented. In addition, the displayed or described coupling or direct coupling or communication may be an indirect coupling or communication between certain interfaces, devices or units, which may be electrical or mechanical coupling, etc.

The units described as separated components may be or not be separated physically. The components displayed as units may be or not be physical units, i.e., the components may be in one position or distributed to multiple network units, which may be selected partly or altogether as needed to realize the embodiments.

In addition, the functional units in the embodiments of the disclosure may be integrated in one processing unit, or each unit is independent physically, or two or more than two units may be integrated in one unit. The integrated units may be implemented either in the manner of hardware or in the manner of software functional units.

If the functions are implemented in the manner of software functional units and sold or used as independent products, the software functional unit may be stored in a computer-readable storage medium. In view of this, the part of the technical solution of the disclosure which makes contribution to the existing technology or the part of the technical solution may be implemented in the manner of software products, and the software products may be stored in a storage medium, including multiple instructions by which a computer equipment (PC, server or network equipment) may implement all of or part of the procedures of the method described in the embodiments of the disclosure. In addition, the foregoing storage medium includes: various medium for storing program codes, such as USB flash, mobile hard disk, ROM (Read-Only Memory), RAM (Random Access Memory), diskette, optical disk.

The above description is only the specific implementation of the disclosure, and the protection scope thereof is not restricted herein. The variation or replacement within the technical scope made by those skilled in the art may fall into the protection scope of the disclosure. Therefore, the protection scope of the disclosure may be subject to the protection scope of the claims.

What is claimed is:

1. A method for performing a measurement before inter-frequency handover of a user terminal, comprising:

receiving spectrum information from a non-service base station, wherein the spectrum information comprises a received power of the non-service base station, and the non-service base station measures an intensity of a signal sent by the user terminal and received by the non-service base station as the received power of the non-service base station;

obtaining a transmitted power of the user terminal; and when it is determined that a difference between the transmitted power of the user terminal and the received power of the non-service base station is smaller than a preset threshold, sending to the user terminal a measurement instruction for instructing the user terminal to perform the measurement on the non-service base station.

2. The method for performing the measurement before inter-frequency handover of the user terminal according to claim 1, wherein the non-service base station measures the intensity of the signal received by the non-service base station as the received power of the non-service base station, wherein the signal received by the non-service base station is sent by the user terminal and carried on a first resource block;

the spectrum information further comprises a measurement time of the non-service base station and identification information of the first resource block; and wherein before the transmitted power of the user terminal is obtained, the method further comprises: sending, by a service base station, to the user terminal a reporting instruction for instructing the user terminal to report the transmitted power of the user terminal, based on the measurement time of the non-service base station and the identification information of the first resource block.

3. The method for performing the measurement before inter-frequency handover of the user terminal according to claim 1, wherein the spectrum information further comprises user terminal identification information corresponding to the user terminal; and wherein before the transmitted power of the user terminal is obtained, the method further comprises: sending, by a service base station, to the user terminal a reporting instruction for instructing the user terminal to report the transmitted power of the user terminal, based on the user terminal identification information.

4. The method for performing the measurement before inter-frequency handover of the user terminal according to claim 1, wherein the obtaining the transmitted power of the user terminal comprises:

sending to the user terminal a first reporting instruction for instructing the user terminal to report the transmitted power of the user terminal; and receiving the transmitted power of the user terminal from the user terminal.

5. The method for performing the measurement before inter-frequency handover of the user terminal according to claim 1, wherein the transmitted power of the user terminal is prestored by a service base station.

6. The method for performing the measurement before inter-frequency handover of the user terminal according to claim 1, wherein the sending the measurement instruction to the user terminal comprises:

sending the measurement instruction to the user terminal when a load of a service base station is larger than a preset load threshold.

7. The method for performing the measurement before inter-frequency handover of the user terminal according to claim 6, wherein the sending a measurement instruction to the user terminal further comprises:

when it is determined that the load of the service base station is smaller than the preset load threshold, sending to the user terminal a second instruction for instructing the user terminal to report a received power of the user terminal, wherein the received power of the user terminal is an intensity of a signal sent by the service base station and received by the user terminal; and when it is determined that the received power of the user terminal is smaller than a preset power threshold, sending the measurement instruction to the user terminal.

8. The method for performing the measurement before inter-frequency handover of the user terminal according to claim 1, further comprising:

sending Sounding Reference Signal configuration information of the user terminal to the non-service base station, wherein the non-service base station measures the received power of the non-service base station according to the Sounding Reference Signal configuration information of the user terminal.

9. The method for performing the measurement before inter-frequency handover of the user terminal according to claim 3, wherein the user terminal identification information uniquely corresponds to the first resource block.

10. A method for performing a measurement before inter-frequency handover of a user terminal, comprising:

receiving, by the user terminal, a measurement instruction from a service base station, wherein the measurement instruction is sent when the service base station determines that a difference between a transmitted power of the user terminal and a received power of a non-service base station in spectrum information is smaller than a preset threshold, the non-service base station measures an intensity of a signal sent by the user terminal and received by the non-service base station as the received power of the non-service base station; and performing, by the user terminal, the measurement on the non-service base station based on the measurement instruction.

11. A service base station, comprising:

a receiver configured to receive spectrum information from a non-service base station, wherein the spectrum information comprises a received power of the non-service base station, and the non-service base station measures an intensity of a signal sent by a user terminal and received by the non-service base station as the received power of the non-service base station;

an obtaining unit configured to obtain a transmitted power of the user terminal;

a determination module configured to determine whether a difference between the transmitted power of the user terminal and the received power of the non-service base station is smaller than a preset threshold; and a sender configured to, when the difference between the transmitted power of user terminal and the received power of the non-service base station is smaller than the preset threshold, send to the user terminal a measurement instruction for instructing the user terminal to perform the measurement on the non-service base station.

12. The service base station according to claim 11, wherein the spectrum information further comprises a measurement time of the non-service base station and identification information of a first resource block;

wherein before the transmitted power of the user terminal is obtained, the sender is further configured to send to the user terminal a reporting instruction for instructing the user terminal to report the transmitted power of the user terminal, based on the measurement time of the non-service base station and the identification information of the first resource block.

13. The service base station according to claim 11, wherein the spectrum information further comprises user terminal identification information corresponding to the user terminal;

wherein before the transmitted power of the user terminal is obtained, the sender is further configured to send to the user terminal a reporting instruction for instructing the user terminal to report the transmitted power of the user terminal, based on the user terminal identification information.

14. The service base station according to claim 11, wherein the sender is further configured to send to the user terminal a first reporting instruction for instructing the user terminal to report the transmitted power of the user terminal; and the receiver is further configured to receive the transmitted power of the user terminal from the user terminal.

15. The service base station according to claim 11, wherein the obtaining unit is configured to obtain a prestored transmitted power of the user terminal.

16. The service base station according to claim 11, wherein the determination module is further configured to determine whether a load of the service base station is larger than a preset load threshold; and the sender is further configured to send a measurement instruction to the user terminal, when the load of the service base is larger than the preset load threshold; and send to the user terminal a second reporting instruction for instructing the user terminal to report the received power of the user terminal, when the load of the service base is smaller than the preset load threshold, wherein the received power of the user terminal is an intensity of a signal sent by the service base station and received by the user terminal.

17. The service base station according to claim 16, wherein the determination module is further configured to determine whether the received power of the user terminal is smaller than a preset power threshold; and
the sender is further configured to send the measurement instruction to the user terminal, when the received power of the user terminal is smaller than the preset power threshold.

18. The service base station according to claim 11, wherein the sender is further configured to send Sounding Reference Signal configuration information of the user terminal to the non-service base station, wherein the non-service base station measures the received power of the non-service base station according to the Sounding Reference Signal configuration information of the user terminal.

19. A user terminal, comprising:
a receiver configured to receive a measurement instruction from a service base station, wherein the measurement instruction is sent when the service base station determines that a difference between a transmitted power of the user terminal and a received power of a non-service base station in spectrum information is smaller than a preset threshold, and the non-service base station measures an intensity of a signal sent by the user terminal and received by the non-service base station as the received power of the non-service base station; and
a measurement module configured to perform a measurement on the non-service base station based on the measurement instruction.

20. The user terminal according to claim 19, wherein the receiver is further configured to receive a first reporting instruction from the service base station; and the user terminal is further comprises:
a sender configured to report the transmitted power of the user terminal in response to the first reporting instruction sent by the service base station.

21. The user terminal according to claim 20, wherein
the receiver is further configured to receive a second reporting instruction from the service base station, wherein the second reporting instruction is sent when the service base station determines that a load of the service base station is smaller than a preset load threshold; and receive the measurement instruction from the service base station; and
the sender is further configured to send a received power of the user terminal to the service base station in response to the second reporting instruction, wherein the received power of the user terminal is an intensity of a signal sent by the service base station and received by the user terminal.

* * * * *